United States Patent
Peterffy et al.

(10) Patent No.: US 7,941,364 B2
(45) Date of Patent: May 10, 2011

(54) PRICE IMPROVEMENT PROCESSOR FOR ELECTRONIC TRADING OF FINANCIAL INSTRUMENTS

(75) Inventors: Thomas Peterffy, Greenwich, CT (US); Ken Leibler, Chestnut Hill, MA (US); Luc Bertrand, Baie d'Urfe (CA)

(73) Assignee: Boston Options Exchange Group, LLC, Boston, MA (US)

( * ) Notice: Subject to any disclaimer, the term of this patent is extended or adjusted under 35 U.S.C. 154(b) by 1029 days.

(21) Appl. No.: 10/697,851

(22) Filed: Oct. 30, 2003

(65) Prior Publication Data
US 2004/0254804 A1 Dec. 16, 2004

Related U.S. Application Data

(60) Provisional application No. 60/422,408, filed on Oct. 30, 2002.

(51) Int. Cl.
*G06Q 40/00* (2006.01)
(52) U.S. Cl. .......................................... 705/38
(58) Field of Classification Search ............... 705/38
See application file for complete search history.

(56) References Cited

U.S. PATENT DOCUMENTS

| | | | | |
|---|---|---|---|---|
| 6,061,789 A * | 5/2000 | Hauser et al. | ................. | 713/168 |
| 6,618,707 B1 * | 9/2003 | Gary | ........................... | 705/36 R |
| 6,850,907 B2 * | 2/2005 | Lutnick et al. | ................. | 705/37 |
| 7,099,839 B2 * | 8/2006 | Madoff et al. | ................. | 705/37 |
| 7,162,448 B2 * | 1/2007 | Madoff et al. | ................. | 705/37 |
| 7,315,840 B1 * | 1/2008 | Keith | ............................. | 705/37 |
| 2001/0042040 A1 * | 11/2001 | Keith | ............................. | 705/37 |
| 2001/0044767 A1 * | 11/2001 | Madoff et al. | ................. | 705/37 |
| 2002/0138401 A1 * | 9/2002 | Allen et al. | ..................... | 705/37 |
| 2002/0194105 A1 * | 12/2002 | Klein | ............................. | 705/37 |
| 2003/0004858 A1 * | 1/2003 | Schmitz et al. | ................. | 705/37 |
| 2003/0120585 A1 * | 6/2003 | Rosenblatt | ...................... | 705/37 |
| 2003/0158806 A1 * | 8/2003 | Hanley et al. | ................... | 705/37 |
| 2003/0177086 A1 * | 9/2003 | Gomber et al. | ................. | 705/37 |
| 2003/0182224 A1 | 9/2003 | Horrigan et al. | | |
| 2004/0210512 A1 * | 10/2004 | Fraser et al. | .................... | 705/37 |
| 2006/0229967 A1 * | 10/2006 | Sweeting | ........................ | 705/37 |
| 2010/0030655 A1 * | 2/2010 | Lutnick et al. | ................. | 705/26 |

OTHER PUBLICATIONS

Ross et al.: Price Improvement of SuperDot market order on the NYSE, Mar. 11, 1996, New York Stock Exchange, NYSE Working Paper 96-02, pp. 1-32.*
Bacidore et al.: Depth improvement and adjust price improvement on the New York Stock Exchange, 2002, Journal of Financial Markets, 5, pp. 169-195.*
U.S. Appl. No. 60/422,408, Oct. 30, 2002, Peterffy et al.

* cited by examiner

*Primary Examiner* — Bijendra K. Shrestha
(74) *Attorney, Agent, or Firm* — Burns & Levinson LLP; Stephen Y. Chow (57) ABSTRACT

A price improvement processor to effectuate more rapid matching of bids and offers of financial instruments by conducting a rapid automated auction in which certain market participants may provide price improvement in increments that are finer than the prevailing standard minimum price variation and are provided a certain allocation as an incentive for such price improvements.

20 Claims, 5 Drawing Sheets

| Book 25 Security X | | | | | |
|---|---|---|---|---|---|
| Broker | Qty | Bid | Ask | Qty | Broker |
| MMB | 50 | 2.09 | 2.15 | 100 | MMA |
| MMA | 100 | 2.09 | | | |
| Broker | 100 | 2.09 | | | |
| MMA | 100 | 2.05 | | | |

107

| Book 25 Security X | | | | | |
|---|---|---|---|---|---|
| Broker | Qty | Bid | Ask | Qty | Broker |
| MMC | 20 | 2.10 | 2.15 | 100 | MMA |
| MMB | 50 | 2.09 | | | |
| MMA | 100 | 2.09 | | | |
| Broker | 100 | 2.09 | | | |
| MMA | 100 | 2.05 | | | |

108

| Buy | Trade Executions | | | Sell |
|---|---|---|---|---|
| Broker | Qty | Price | Qty | Broker |
| MMC | 20 | 2.10 | 20 | Broker |
| MMB | 32 | 2.09 | 32 | Broker |
| MMA | 16 | 2.09 | 16 | Broker |
| Broker | 32 | 2.09 | 32 | Broker |

109

| Book 25 Security X | | | | | |
|---|---|---|---|---|---|
| Broker | Qty | Bid | Ask | Qty | Broker |
| MMA | 100 | 2.05 | 2.15 | 100 | MMA |

PRICE IMPROVEMENT PROCESSOR FOR ELECTRONIC TRADING OF FINANCIAL INSTRUMENTS

RELATED APPLICATIONS

The present invention is disclosed in a provisional application filed under 35 U.S.C. §111(b), U.S. Application No. 60/422,408, filed Oct. 30, 2002, which, including the Appendix thereto, is expressly incorporated herein by reference. Priority is hereby claimed under 35 U.S.C. §119(c) for that earlier filed provisional application.

FIELD OF THE INVENTION

This invention relates generally to the electronic trading of financial instruments, and more particularly to a processor for improving prices in an automated auction exchange for the trading of equity option contracts.

BACKGROUND OF THE INVENTION

Traditionally, exchanges for trading of financial instruments were physically localized on trading floors and involved "specialists" to create markets for particular financial instruments, matching buyers and sellers of such instruments, buying and selling for their own accounts, and controlling trading for the particular financial instruments. With the rise of electronic and automated trading of financial instruments, exchanges have grown on which professional broker-dealers have privileges to buy and sell on behalf of public customers as well as on their own accounts, subject to rules set by the exchanges, as self-regulatory organizations ("SROs") approved by the Securities and Exchange Commission in the United States, such as the Boston Stock Exchange. According to such rules, some of these professionals are designated and afforded certain privileges as "market makers", each having the responsibility to make a market in the trading of one or more instruments by always maintaining a bid to buy at a bid price and an offer to sell at an offer price. Typically in the automated exchanges, there may be competing market-makers for the same instrument, in contrast to the single specialist in traditional exchanges.

When a purchaser, typically through a broker, orders a purchase at "market", a trade may be executed at the offer price set by one or more market-makers at the time. When a seller, typically through a broker, orders a sale at "market", a trade may be executed at the bid price set by one or more market-makers at the time. Limit orders are bids or offers at a specified price that may not be matched by offers or bids (that is, "non-marketable") until there is price movement by a market maker or by other market participants, typically broker-dealers. These orders are kept on a book according to exchange rules until matches are made and trades executed.

In the United States, a National Best Bids and Offers ("NBBO") database is continuously updated with data from the order books of the various securities exchanges. NBBOs for equity option contracts are reported by the Options Price Reporting Agency ("OPRA") currently in increments of $0.05 of price quoted as the price per share of the underlying equity instrument (generally 100 per option contract), as they are currently traded on the exchanges.

In the prevailing electronic marketplace for equity options established under such rules, at any given time, there are NBBOs which may be separated by a spread for an indeterminate period of time until bidders (buyers) and offerors (sellers) change their bids or offers by human or automated decision. It is desirable to close these spreads more rapidly through an improvement in price (raising bids and lowering offers).

SUMMARY OF THE INVENTION

The invention disclosed herein to effectuate more rapid matching of bids and offers is a price improvement processor that conducts a rapid automated secondary auction within an electronic primary auction, in which certain market participants may, during a short price improvement period ("PIP"), provide price improvement in increments that are finer than the prevailing standard minimum price variation and are provided a certain allocation as an incentive for such price improvements. This processor may be employed as a stand-alone system or as part of a larger trading engine or system.

In the preferred embodiment, the PIP processor is utilized on an electronic non-specialist auction market or exchange ("Exchange"), governed by the rules of an SRO, where orders from all types of market participants may interact directly with each other on a price/time priority basis. When a market participant initiates a price improvement auction, the PIP processor attracts orders and subjects them to price improvement and real price competition without which they would otherwise simply be executed at the NBBO reported from the OPRA. The Exchange provides a price/time priority based limit order book where any public customer (a non-broker-dealer customer) or broker-dealer market participant could submit orders (post prices) or take liquidity. It also provides a facility for Order Flow Providers, participants representing as agent customer orders, to interact with their own order flow but only at prices better than the best bid or offer on the NBBO. It further provides an opportunity for market makers (participants registered with the SRO or Exchange for the purpose of making markets in securities) to step in and compete for those orders quickly and anonymously by offering an even better price for the customer.

In the preferred embodiment, the Exchange includes as participants multiple and competing market makers, in contrast to a specialist-driven system. There are no designated specialists, primary market makers, or lead market makers with authority to control trading in a particular options class. Market making in an options class on the Exchange is open to all qualified options participants who are approved by the SRO as market makers (all qualified participants are hereinafter referred to as "Participants"). All appointed competing market makers are responsible for ensuring basic liquidity. This competition encourages tighter spreads and better pricing to the ultimate advantage of the investor. In the preferred embodiment, in the interest of maintaining a flat and open marketplace, the market makers' privileges within their appointed classes are limited to the ability to maintain orders on all series and to the opportunity to participate in PIP auctions.

In addition, as the Exchange is fully automated and without a central trading floor, Participants would have to access the Exchange from remote locations. The attendant reduction in fixed costs and the low barriers to entry allows a wider variety of market participants than heretofore seen, resulting in more vigorous competition to the ultimate advantage of the customers who use the Exchange.

All orders on the Exchange would be entered on an electronic Central Order Book ("Book"). Only prices and quantities are displayed to all trading Participants, maintaining full anonymity with regard to the ownership of each order. With some exceptions to encourage the initiation of a price improvement bid, all orders are matched on a strict price and time priority algorithm. This will result in better pricing since the price and time priority algorithm gives a strong incentive to trading Participants to post their very best prices rapidly. There is very limited opportunity to "step up and match" in order to participate in a trade on the Exchange.

All orders on the Book are firm at all times for all trading participants. An order on the Book is available in its entirety to all parties on a "first come, first serve" basis whether from a market maker, public customer or broker/dealer account.

The embodiments described herein relate to a market that conforms to the rules imposed by a certain SRO. It is to be understood that a market, which conforms to a different set of rules, is nevertheless within the scope of the invention. Further, it is to be understood that the use of the invention is not limited to an SRO or registered exchange, and may be administered by other types of business entities.

The PIP process facilitates interaction with customer orders by Order Flow Providers and market makers, providing a very rapid mini-auction starting at a price better than the current NBBO where Participants could compete to improve the customer side of the trade.

BRIEF DESCRIPTION OF THE DRAWING

For a better understanding of the present invention, together with other and further objects thereof, reference is made to the accompanying drawing and detailed description, wherein.

DETAILED DESCRIPTION OF A PREFERRED EMBODIMENT OF THE INVENTION

Figure 1:
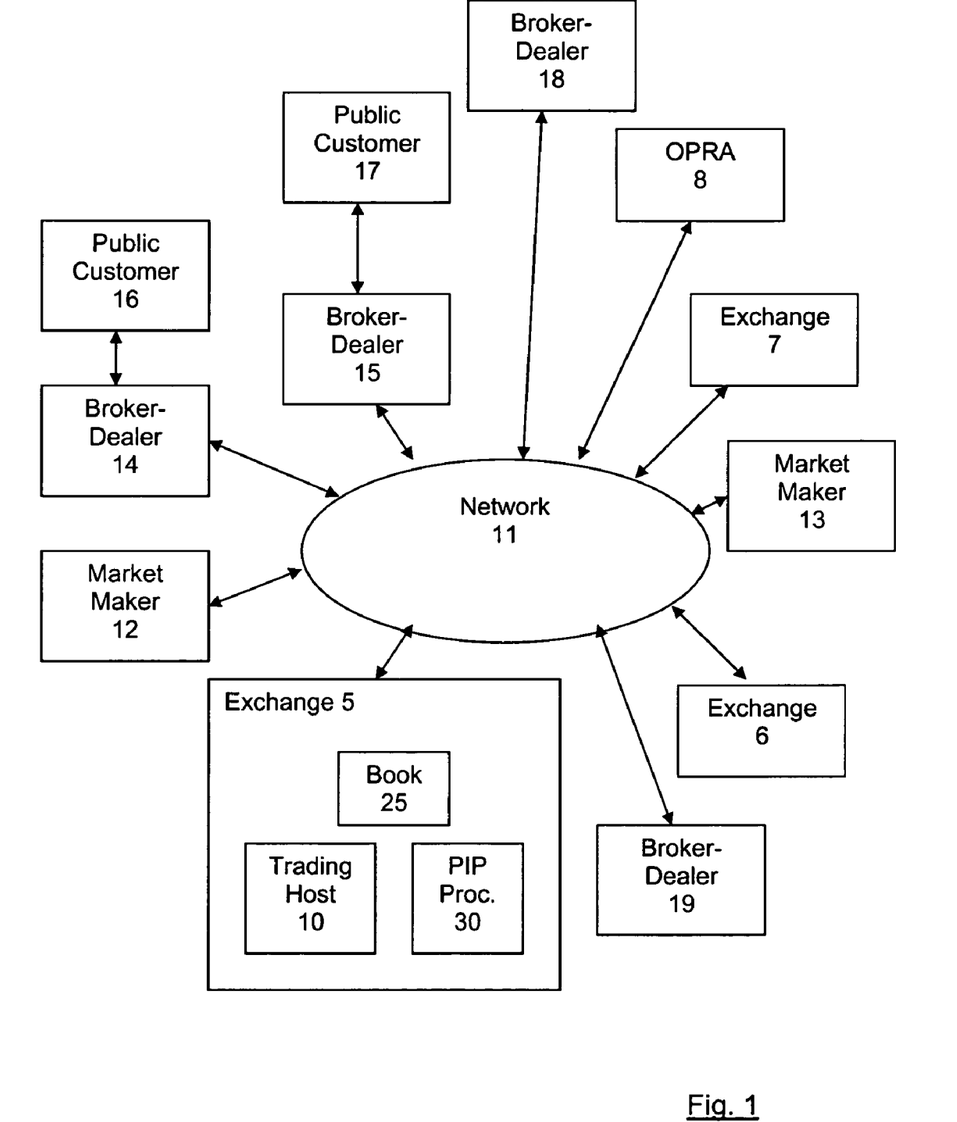
FIG. 1 is a block diagram of the price improvement processor in the context of an equity options exchange network.

FIG. 1 shows the PIP Processor 30 of the invention in the context of an equity options electronic exchange 5 connected to a network 11, which may include dedicated channels between parties. In the preferred embodiment, there are Participants including market makers 12 and 13 and Order Flow Providers (broker-dealers) 14 and 15.

Each market maker is appointed to an options class (all options contracts of the same type and style covering the same underlying security) listed on the electronic exchange, and at least two market makers must be appointed for trading in a particular class. Market makers electronically engage in a course of dealing for their own account to enhance liquidity available on the electronic exchange and to assist in the maintenance of fair and orderly markets. Market makers must maintain continuous firm, two-sided quotes, which are limit orders submitted to the electronic exchange 5 by a market maker, in those options classes in which the market maker is appointed to trade and clear and settle transactions through the facilities of a registered clearing member.

Order Flow Providers ("OFPs") are those Participants representing orders of public customers 16 and 17 and other broker-dealers 18 and 19 who do not trade directly on the electronic exchange 10. OFPs may also register as market makers. OFPs may trade as principal, both as contra party to Customer Orders submitted to the electronic exchange 10 by such OFP and as contra party to unrelated orders submitted by other Participants to the electronic exchange 5 and processed by its computer programmed to function as a trading platform or engine, trading host 10. OFPs in the preferred embodiment may only act as contra party to their own customer orders pursuant to the SRO rules regarding the PIP process.

Trading host 10 operates according to the following general rules. Each market maker enters its own independent quotations into the trading host 10 through a front-end interface or receiver 21 such as provided as an interface to the NSC 390 Trading Engine licensed by AtosEuronext of Amsterdam. Market makers enter a quantity with their quotations, which must meet the minimum size requirements. OFPs enter agency and principal orders into the trading host 10. Market makers and OFPs may enter into the electronic exchange the following standard types of orders: market orders, limit orders, Day Orders, Good-Til-Canceled Orders, Fill-or-Kill Orders, Fill-and-Kill Orders, Market-on-Open Orders, and Minimum Volume Orders as defined below. Market makers and OFPs would receive through front-end interface or transmitter 22 from the electronic exchange information on all of the orders and quotations pending in the Trading host 10, including a display of up to the five best bids and offers currently quoted on the electronic exchange in each options series, as well as the aggregate size at each of the five best prices.

Book 25 contains all the Participant' orders. In the preferred embodiment, bids are made in dollars per share of underlying securities in the options contract, typically 100 shares; trading increments are allowed as follows: (1) if the options contract is trading at less than $3.00 per option, five (5) cents; (2) if the options contract is trading at $3.00 per option or higher, ten (10) cents; and (3) if the options contract is traded pursuant to the procedures of the PIP Processor 30 then one (1) cent.

Orders for option contracts and strategies (combination orders) may be submitted to the Exchange 5 from commencement of pre-opening until market close. Submitted orders, once validated by the trading host 10, are time-stamped to within one one-hundredth of a second.

A bid is represented as an order to buy ("buy order"); an offer is represented as an order to sell ("sell order"); and an execution, or trade is defined as the matching of a buy order and sell order in the Book 25. The following types of orders may be submitted to the trading host 10:

(1) Limit Order. Limit Orders entered into the Book 25 are executed at the price stated or better. Any residual volume left after part of a Limit Order has traded is retained in the Book 25 until it is withdrawn or traded. All Limit Orders (with the exception of those with a Good 'Til Cancelled designation as described below) are automatically withdrawn by the trading host at market close; and (2) Market Order. Market Orders entered into the Book 25 are executed at the best price available in the market for the total quantity available from any contra bid (offer). Any residual volume left after part of a Market Order has been executed is automatically converted to a limit order at the price at which the original market order was executed.

(3) Market on Opening Order. Market on Opening Orders entered into the Book 25 are executed on the market opening at the best price(s) available in the market until all available volume has been traded. Market on Opening Orders have priority over Limit Orders and are executed as a Market Order, as set forth above.

Where no order type is specified, the trading host 10 will reject the order.

The following designations can be added to these types of orders:

(1) Good 'Til Cancelled (GTC). A GTC designation can be added to Limit Orders and remain in the BOX Book until the order trades, is withdrawn by the relevant responsible trader or the exchange at the options Participant's request; is automatically withdrawn by the trading host 10 at market close on the date specified at the time of order entry; or is automatically cancelled by the trading host 10 on expiration of the contract month to which the order related.

(2) Fill and Kill (FAK). An FAK designation can be added to Limit Orders. FAK orders are immediately executed against any existing orders at the specified price or better up to the volume of the FAK order. Any residual volume left after part of the FAK order has traded will be automatically cancelled by the trading host 10.

(3) Fill-Or-Kill (FOK). An FOK designation can be added to Limit Orders. FOK orders will only be executed if there is sufficient volume available at the specified price or better for the order to be executed in full. If this is not the case the order will be automatically cancelled by the trading host 10.

(4) Minimum Volume (MV). An MV designation can be added to both Limit Orders and Market Orders. MV orders will only be executed if the specified minimum volume is immediately available to trade (at the specified price or better in the case of Limit Orders). Where a volume equal to or greater than the specified minimum volume of an MV order has traded, the residual volume will be retained in the Book 25 in the case of Limit Orders.

The identity of Participants who submit orders to the trading host 10 remain anonymous to all other market participants at all times. Orders parsed and entered into the Book 25 are transmitted in broadcast fashion by the trading host 10 using transmitter 22 to Participants without indication of the identity of the submitters of the orders. Subsequent settlements of trades typically are performed under confidentiality requirements.

Orders may be edited once they are held in the Book. Editing of orders may be applied to price, size and cancellation date (for GTC orders). The time-stamp assigned by the trading host 10 at the entry of the original order will be updated if either the price is changed or the size increased, i.e., the order will assume an inferior position in the time priority "queue". (This is functionally equivalent to receiving a new replacement order with a new time stamp; additional data regarding the original order may be tracked through known means). A reduction in size or an amendment to the cancellation date has no effect on the time-stamp.

Orders held in Book 25 can be withdrawn, individually or as a block, by the relevant Participant or under his authority. (This is subject to the PIP process described below.)

All orders with the exception of GTC orders will be purged at market close. All orders, including GTC orders, will be cancelled at close of business on the last trading day of the expiration month to which they relate.

Limit Orders of Participants submitted to the trading host 10 would be ranked and maintained in the Book 25 according to price-time priority, such that within each price level, all orders would be organized by the time of entry. (This may be implemented in a virtual stack using well-known programming methods.) Limit Orders, with no other conditions, are ranked ahead of all other orders based on the specified limit price and the time of original order entry. Conditional orders are ranked behind all unconditional limit orders at the specified limit price based upon the time of order entry with earlier orders receiving priority. No distinction is made to this priority with regard to account designation (public customer, broker/dealer or market maker). The orders are ranked based on the specified limit price and the time of original order entry in the trading host 10. If an order is executed in its entirety, its price-time priority is also exhausted and so, the next order in price-time priority would move to the top of the Book 25. A Participant must submit a new order if it wishes to refresh its order. This new order would be ranked at the specified limit price according to the time that the new order was entered.

The number of orders and their total quantity at each of the five best price levels in Book 25 are displayed through broadcast transmitter 22 to all Participants on an anonymous basis.

Trades occur when orders or quotations match in the trading host 10. If more than one order has been entered into the trading host 10 at the same price, priority would be based on the time of order entry. If a Participant enters a limit order into the trading host 10 that matches an order already in the trading host, a trade would occur at the price of the order already in the trading host up to the available size. After executing against that order, the limit order would trade against other orders in the trading host until the limit order is filled in its entirety or the limit order depletes the available size at that price. If any amount of the limit order remains unexecuted, the balance of the order would become either the best bid or offer.

The details of each trade on the Exchange 5 are automatically reported by the trading host 10 to a national trade reporting system such as OPRA 8, which also receives information from other exchanges 6 and 7. All post-trade details are published on an anonymous basis. However, for each trade, counterparty details are made available on a delayed basis after the trade is executed to Participants that were party to the trade.

Figure 2:
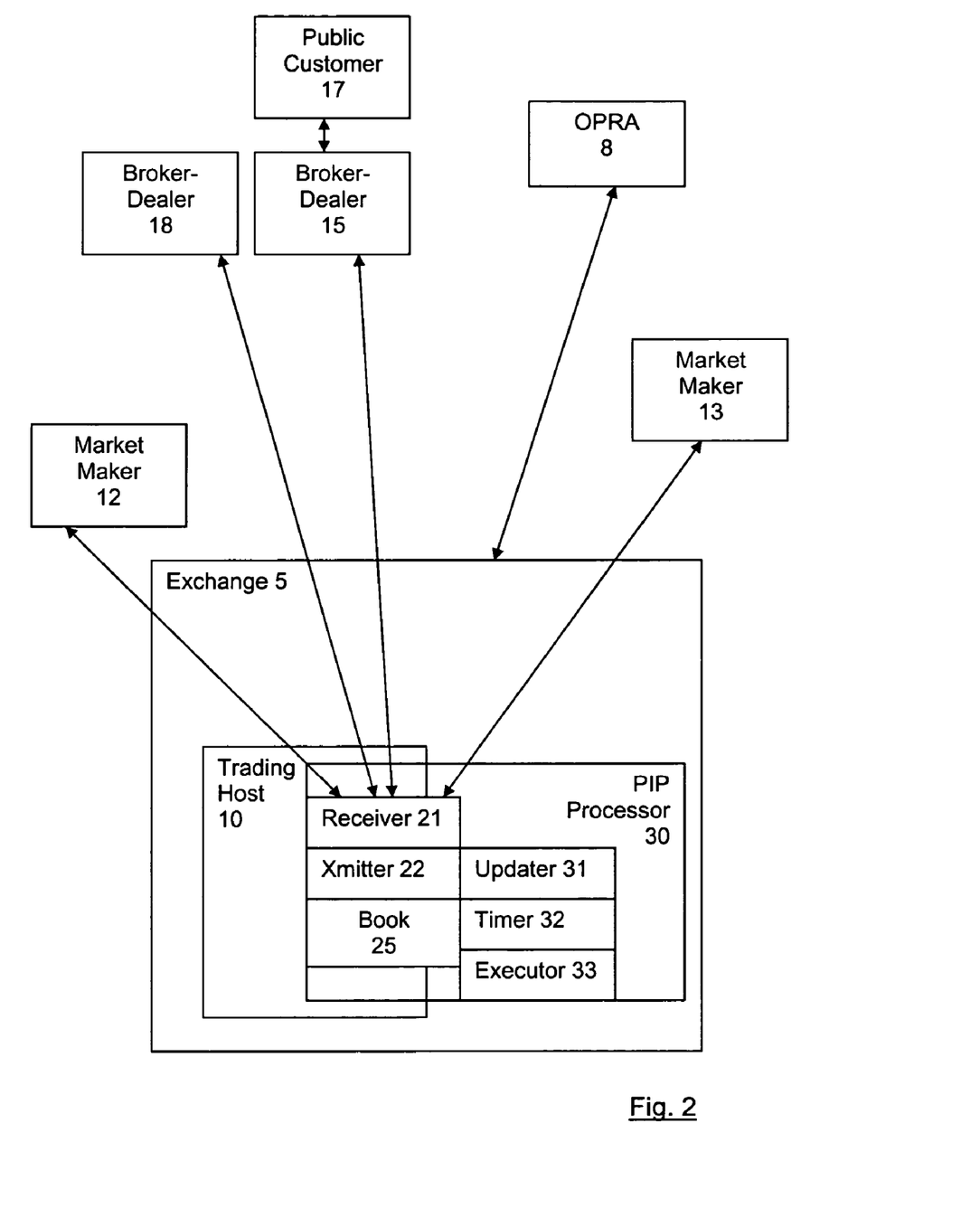
FIG. 2 is a data flow diagram of the price improvement processor.

Referring to FIG. 2, within this context of the Exchange 5 and the trading host 10, with which it shares resources, the PIP processor 30 enables a process for rapid improvement of prices. In the preferred implementation for equity option trading, the PIP processor provides guaranteed price improvement opportunities for customers. It provides an OFP with the ability to use the PIP process to enter a customer order and execute that order as principal. Under rules established for the PIP process, an OFP is not otherwise permitted to execute an agency order as principal unless the order is first permitted to interact with other interest on the Exchange 5 through the PIP system. Exchange rules typically prevent an OFP from entering simultaneous customer and proprietary orders before there is an opportunity for the customer order to interact with other trading interest on the Exchange 5.

In the preferred embodiment for equity options trade price improvement, the following rules are implemented in the processing of the PIP processor 30:

(1) An OFP may submit any customer order for price improvement into the PIP processor 30 at a price of at least one cent ($0.01 is used as an example) better than the prevailing NBBO bid. There is no minimum size requirement. This may be qualified through the updater 31. (To assure liquidity in the PIP process, the qualification may include a minimum number of market makers, for example, three, quoting on relevant option contracts at the commencement of the PIP process).

(2) Market makers and the introducing OFP may compete for the customer execution in one-cent increments ($0.01 is used as an example); however, all Participants are informed of each price improvement (through broadcast transmitter 22, which may be limited just to participants in the particular PIP process) and may submit competing orders at standard price increments.

(3) A market maker must match or improve the price proposed by the Primary Improvement Order (the order that initiates the PIP process to improve the price for a contra market customer order, as defined below) for the opportunity to participate in the execution.

(4) The PIP would run for a brief period (for example three seconds, clocked by PIP Timer 32) and cannot be cancelled by the OFP.

(5) Execution (by transaction executor 33) is by price and time priority at the end of the PIP with two exceptions: (a) the OFP is guaranteed a minimum quantity provided he has matched the PIP execution price and (b) the first market maker who has a quote that is equal to the NBBO on the contra side of the market as the Customer Order at the instant the PIP process commences, designated as the "Market Maker Prime", may in some cases have partial time priority over other market makers at the end of the PIP process.

(5) As the execution of the Customer Order is guaranteed at the start of the PIP, the Customer Order has priority over all other orders on that side of the market during the PIP.

Improvement Orders are specialized orders submitted in increments of $0.01 ($0.01 is used as an example) that are only valid in the PIP process. Improvement Orders may not be submitted in increments smaller than $0.01 ($0.01 is used as an example). An Improvement Order is an order by a market maker or the introducing OFP that seeks to gain priority to give the contra customer order an improved execution price over the competing Improvement Orders of the other PIP Participants. Only the market makers may submit competing Improvement Orders and only for those classes within their appointment.

OFPs executing agency orders may designate market and marketable limit customer orders for price improvement and submission to the PIP. Customer orders designated for the PIP would be submitted to the Exchange 5 with a matching contra order, the Primary Improvement Order, an order by a market maker or the introducing OFP that seeks to gain priority to give the contra customer order an improved execution price over the competing Improvement Orders of the other PIP Participants, equal to the full size of the customer order. The Primary Improvement Order would be on the opposite side of the market than that of the original customer order and represent a bid (offer) that is at least $0.01 greater than the bid (less than the offer) of the NBBO at the time of the commencement of the PIP.

OFPs may submit Improvement Orders only in the PIP auction for which they have submitted the Primary Improvement Order. The subsequent price modifications to an OFP's Primary Improvement Order are treated as new Improvement Orders for the sake of establishing priority in the PIP process. Market makers and OFPs meeting the foregoing criteria would be deemed PIP Participants for that specific PIP only, and may continually submit competing Improvement Orders during that PIP. Participants not deemed PIP Participants may nonetheless submit orders to the trading host 10 during the PIP in order to compete; however, the normal price increments would apply to these orders.

Improvement Orders are firm and cannot be cancelled during the PIP process. Thus, from the outset of the PIP a customer is guaranteed a locked-in trade at a price at least $0.01 better than the NBBO in the preferred embodiment, and the OFP (and not the customer) bears full market risk during the PIP. An OFP is not permitted to cancel its Primary Improvement Order or the customer order nor modify the size of its Primary Improvement Order at any time during the PIP, and may only modify the price of its Primary Improvement Order by improving it. A market maker, except for a market maker that has submitted a Primary Improvement Order, may (1) submit a competing Improvement Order for any size up to the size of the customer order, (2) submit competing Improvement Order(s) for any price equal to or better than the Primary Improvement Order, (3) improve the price of his Improvement Order at any point during the PIP, and (4) decrease the size of his Improvement Order, but only if he improves the price of that order.

At the conclusion of the PIP, the customer order is matched in accordance with price/time priority against the best prevailing orders on the Exchange 5, whether Improvement Orders or subsequent "unrelated orders" to the PIP that were received by the Exchange 5 during the PIP process from non-PIP Participants. (An "unrelated order" is a non-Improvement Order entered into the Exchange 5 during a PIP.) Any portion of an Improvement Order left unfilled would be cancelled. The only exceptions to time priority in the PIP matching process concern limited priority accorded the OFP and Market Maker Prime at the PIP conclusion; these are described below in detail.

In cases where an unrelated order on the same side as the customer order is submitted to the Exchange 5 during a PIP, which is immediately executable (all or partially) against either an Improvement Order or an order on the Book, the PIP process would be concluded and the customer order would be matched with the Improvement Order(s) to the fullest extent possible. Improvement Orders would not be matched with unrelated orders; however, the customer order may be executed against unrelated orders where the latter have a better price than the Improvement Order.

The Exchange, using the PIP Processor, provides strong incentives for both OFPs and market makers to compete aggressively for customer orders entered into the PIP process. In contrast to some other systems, a rule is imposed that no one would get a "last look" to step up and match the prices bid or offered during the PIP. Therefore, the OFP attempting to trade against its own order through the PIP process, as well as the market makers who are competing to participate on that order, all have a strong incentive to put their best prices forward first before the PIP ends. In the PIP the market maker must improve the price proposed by the Primary Improvement Order of the OFP if the market maker is to participate in the execution. The PIP process is not a face-to-face or screen-based negotiation, but a true auction—where market participants are anonymous, where all the prices are firm from the beginning, where the auction cannot be cancelled by the facilitation firm, and where no one gets a last look to change one's price before the auction ends. Since the PIP is an anonymous trading environment where there is no specialist or market maker who controls the process and there is no physical, technological or procedural impediment to posting a better price and breaking into a trade, market makers would have the opportunity and incentive not to let trades happen at uncompetitive prices.

The PIP auction process should be brief, for example three seconds, providing enough time for a vigorous, multi-round, electronic price improvement auction among the market makers and the OFP who initiates the PIP, and yet is not so long that it is economically infeasible for OFPs to be firm for the customer order for at least $0.01 better than the prevailing NBBO at the inception of the PIP. This gives the customer price protection against market movements but also exposes the OFP to full market risk during the entire course of the PIP. This exposure cannot be hedged because the OFP has no way of knowing with certainty how much—if any—of the trade the OFP would receive because the OFP's price may be matched or bettered by any market maker during the PIP.

Balanced against the fact that the OFP is held firm and bears full market risk during the PIP, the PIP must nonetheless be long enough to assure that the OFP's price to the customer is a fair one—meaning among other things that a competitive, multi-round auction is possible between and among the OFP and the market makers in the relevant class. As a practical matter, the PIP process for all Participants would necessarily be governed by computerized systems, not by human traders. Market makers and OFPs can easily either develop their own software to manage trading on the Exchange 5, or utilize one of the many front-end solutions that have been written to connect with electronic-based exchanges.

At the conclusion of the PIP, the customer order is executed against all orders on the opposite side of the Book (both Improvement Orders, market maker quotes, unrelated orders and the Primary Improvement Order submitted by the OFP) following price priority. When two or more orders on the opposite side of the Book are at an identical price limit, time priority is used with two exceptions:

(1) If the OFP Primary Improvement Order is equal to the best limit price, the Primary Improvement Order has priority over all orders up to forty percent (this allocation is used as an example) of the customer order.

(2) If there is a Market Maker Prime for this PIP, and the Market Maker Prime's Improvement Order is also at the best limit, the Market Maker Prime has priority over all other market maker Improvement Orders and unrelated orders up to one-third (this allocation is used as an example) of the unexecuted portion of the customer order remaining at that price level.

Thus, in the preferred embodiment, the OFP who submitted the Primary Improvement Order retains certain priority privileges.

(1) If the OFP has improved the price of its Primary Improvement Order during the PIP to match a competing Improvement Order or unrelated order at the execution price, the OFP retains an allocation right up to forty percent (this percentage is used as an example) of whatever quantity is remaining of the customer order, notwithstanding the time priority of the competing Improvement Order; and (2) When an Improvement Order or unrelated order for less than the full size of the original customer order is the best price, and the OFP's Primary Improvement Order matches in price a competing Improvement Order or unrelated order with time priority at the next price level, the OFP who submitted the Primary Improvement Order retains an allocation right of up to forty percent (this percentage is used as an example) of the unexecuted portion of the customer order at the price of the Primary Improvement Order as modified (if at all) during the PIP.

The Market Maker Prime also has partial time priority over all other market makers in the matching mechanism of the PIP. If more than one market maker meets the Market Maker Prime criteria, the market maker whose quotes has time priority would be the Market Maker Prime for that PIP.

At the conclusion of the PIP, the Marker Maker Prime (if he has entered an Improvement Order during the PIP at a limit price which is executable against the customer order at the end of the PIP) would have a trade allocation priority of up to one-third of the unexecuted portion of the customer order remaining at that price level after any priorities accorded the OFP have been met. The Market Maker Prime would have priority over all other market maker Improvement Orders and unrelated orders up to one third of the unexecuted portion of the customer order remaining at that price level.

If the Market Maker Prime modifies his quote on the Exchange 5 during the PIP to meet the best limit price instead of entering an Improvement Order into the PIP process, the Market Maker Prime rules do not apply to the modified quote. The trade matching follows the normal PIP priority rules where the Market Maker Prime's modified quote would be treated as an unrelated order. If the Market Maker Prime cancels his quote during the PIP, the market maker keeps his status of Market Maker Prime for that PIP.

The Market Maker Prime rules apply only if the Market Maker Prime enters an Improvement Order during the PIP, these rules do not apply to the quote of the Market Maker Prime on the Exchange 5 outside of the PIP process. At the conclusion of the individual PIP, the market maker loses his status as Market Maker Prime. A Market Maker Prime would be determined each time a new PIP is triggered. There is not necessarily a Market Maker Prime for each PIP.

As may be implemented in a combination of hard-wired data flow handlers and general purpose data processors that are programmed, the PIP processor 30 of the preferred embodiment comprises the following, referring to FIG. 2: (a) a receiver 21 for information messages (orders) from market participants that order bids for purchase or offers for sale of an equity option contract, the receiver 21 time-stamping received information messages; (b) an electronic order Book 25; (c) an updater 31 communicating with receiver 21 and Book 25 for qualifying and parsing price, size and time-stamp bid or offer data from information messages received on said receiver and entering said parsed data on said electronic order Book 25 with priority tracked by equity option contract in price and time-stamp of a received and qualified message; (d) a transmitter 22 communicating with Book 25 for display to market participants anonymous data entered on said electronic order book; (e) a price improvement period timer 32 communicating with said updater 31 (i) initiated upon receipt by receiver 22 of an information message from a qualified market participant containing a bid or offer at or better than a preset price improvement over the national best bid or offer for a particular equity option contract and (ii) terminated upon an elapsing of a preset price improvement period time of greater than zero and less than ten seconds; and (f) a transaction executor 33 communicating with timer 32 and Book 25 for allocating and executing upon said termination matches of bids and offers for said particular equity option contact, data for which are entered on Book 25, against market offers or bids in said order, subject to a partial time priority for said qualified market participant, and updating Book 25 accordingly.

Figure 3:
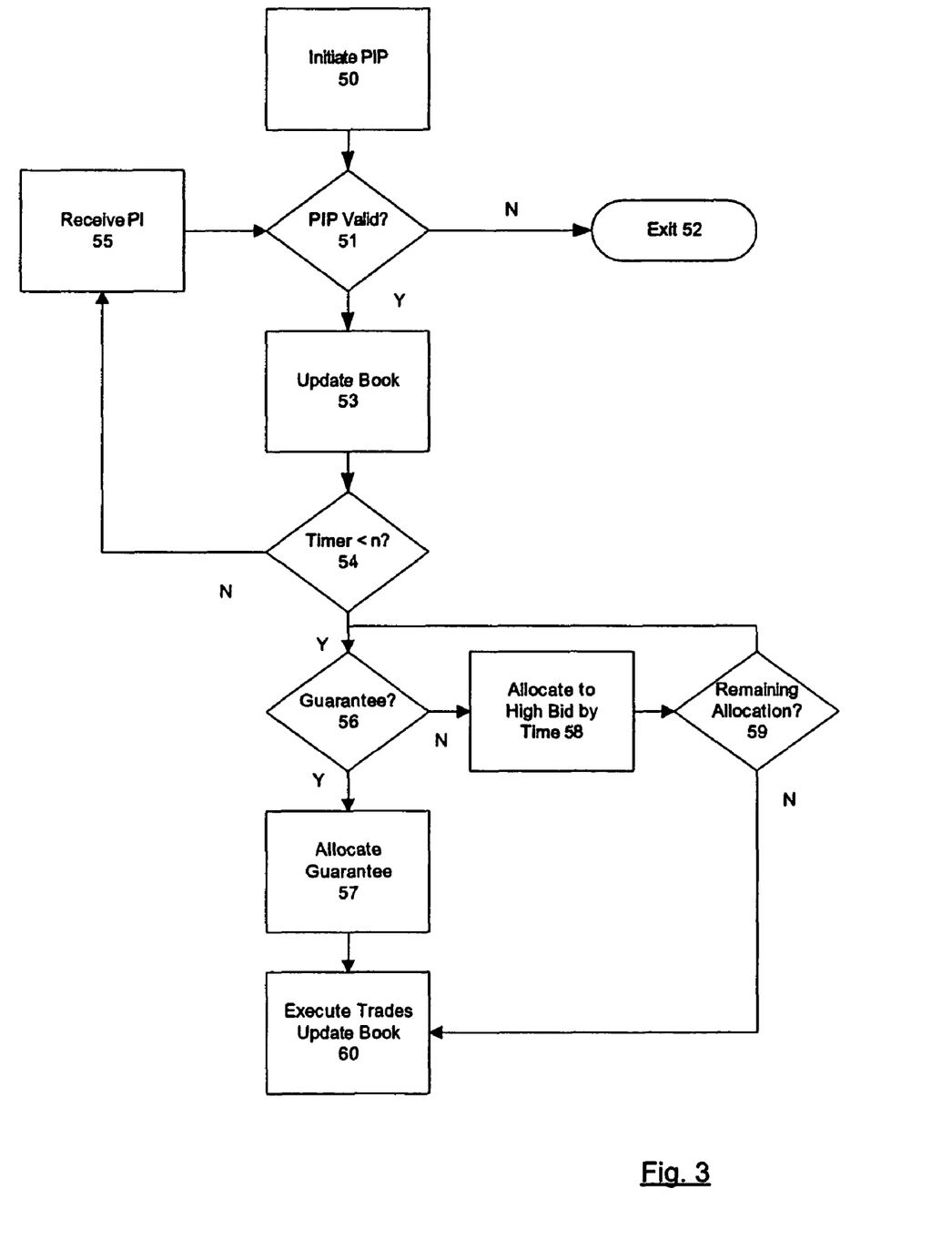
FIG. 3 is a flow diagram of steps taken by the price improvement processor.

FIG. 3 shows one possible logic for the operation of the PIP processor 30. At step 50, the PIP process is initiated, generally by receipt by receiver 21 of an OFP Primary Price Improvement Order. This Order is validated at step 51 for the proper participant and price improvement; if invalid, the process is terminated (or doesn't begin) at step 52. If the initiation is validated, Book 25 is updated at step 53 (and timer 32 initiated). If time n has not elapsed at decision point 54, additional price improvement orders are received at receiver 21 at step 55 and validated at step 51, looping until time n has been exceeded. At the termination of time n, execution by transaction executor 33 commences with one logic of checking at step 56 whether there is a "guarantee" or override of the price/time priority allocation at the best price level; if not allocation is made at step 58 at that price level according to time priority. If it is determined at step 59 that there is remaining allocation, PIP orders are examined at the next best price level and returned to the check at step 56, otherwise trades are executed and Book 25 is updated at step 60. If there is an override of the time priority at a price level as determined at step 56, the "guaranteed" allocation is made at step 57 and execution proceeds at step 60. Functionally equivalent logics are possible and may be implemented in hardware or software or a combination.

Figure 4:
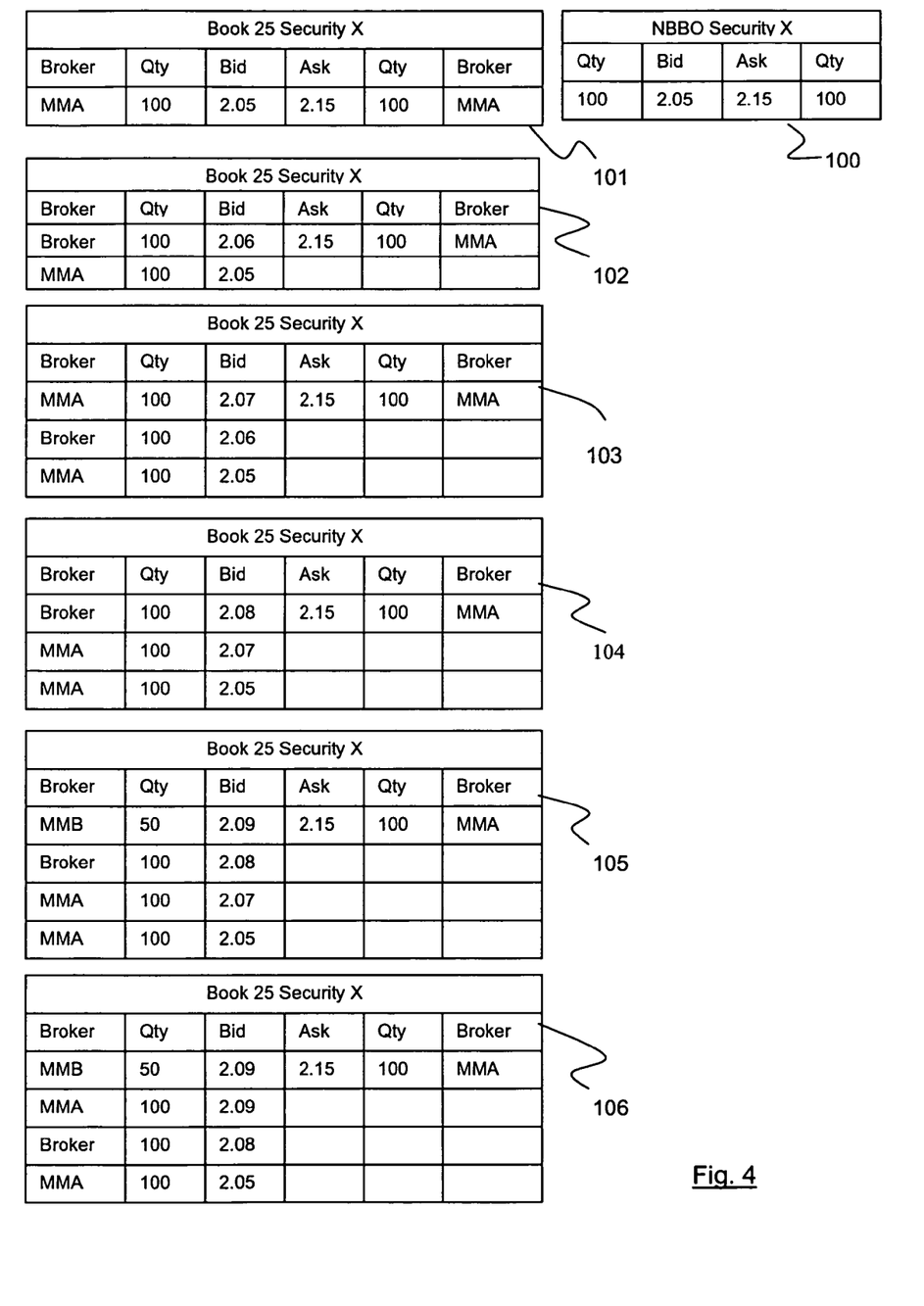
FIGS. 4 and 4A show an example of a transaction utilizing the price improvement processor.

FIG. 4 shows an example of the PIP process:

Step 101: Market maker A is bidding a price equal to the NBBO 100 ($2.05) in Security X.

Step 102: Broker has a customer order to sell 100 contracts/shares of Security X at market. Broker wishes to improve the price to $2.06. Broker initiates the PIP and the three-second auction begins.

Step 103: Market maker A improves the price to $2.07.

Step 104: Broker improves the price to $2.08.

Step 105: Market maker B improves the price to $2.09 for 50 contracts/shares.

Step 106: Market maker A joins the best bid at $2.09.

Figure 4A:
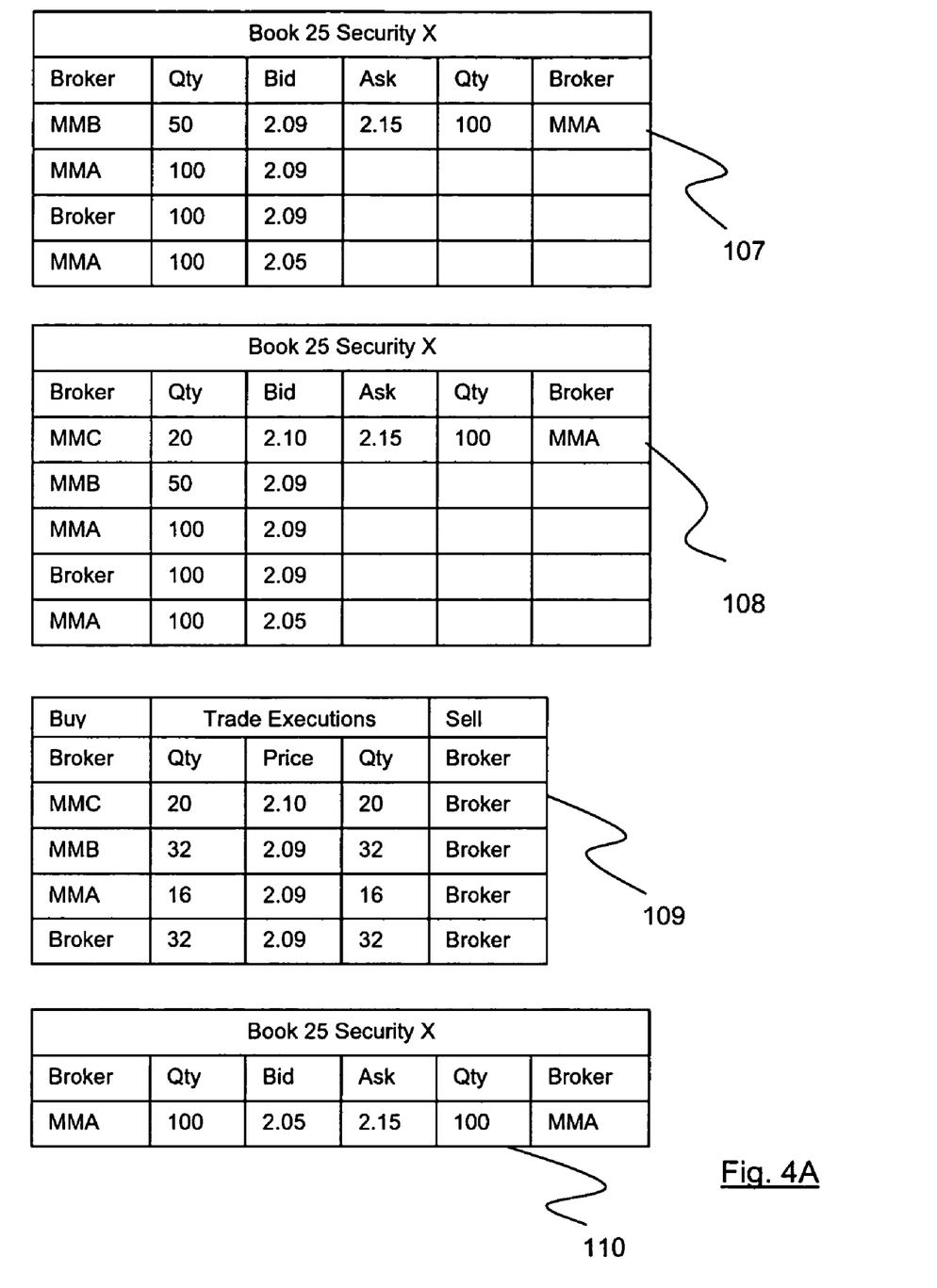

Step 107: Broker meets best bid at $2.09.

Step 108: Market maker C betters bid to $2.10 for 20 contracts/shares.

Step 109: Three-second auction ends and trades are matched as follows:
  Market maker C buys 20 @ $2.10
  Broker buys 32 @ $2.09
  Market maker A buys 16 @ $2.09
  Market maker B buys remaining 32 @ $2.09
  Book 25 is cleared of the PIP quotations, as shown at 110.

In the foregoing specification, the invention has been described with reference to specific embodiments thereof. It will, however, be evident that various modifications and changes may be made thereto without departing from the broader spirit and scope of the invention, including, without limitation, modification of the PIP time period, the PIP participants and the shares allocated as incentives to PIP participants. The specification is, accordingly, to be regarded in an illustrative rather than a restrictive sense.

We claim:

1. A processor for conducting a secondary auction in electronic trading of financial instruments comprising:
   (a) a receiver for information messages from market participants in a primary auction that bid for purchase or offer for sale of a financial instrument, said receiver time-stamping received information messages;
   (b) an electronic order book;
   (c) an updater communicating with said receiver and said electronic order book for qualifying and parsing price, size and time-stamp bid or offer data from information messages received on said receiver and entering said parsed data on said electronic order book with priority tracked by instrument in price and time-stamp of a received and qualified message;
   (d) a transmitter communicating with said electronic order book for display to market participants during said secondary auction data on price and quantity bid, but anonymous as to the identity of the bidder, entered on said electronic order book;
   (e) a price improvement period timer defining the pendency of the secondary auction, communicating with said updater (i) initiated upon receipt by said receiver of an information message from a qualified market participant containing a bid or offer at or better than a threshold price improvement, said threshold preset at the processor, not by the market participant, for said secondary auction, over the best bid or offer prevailing across multiple markets for a particular instrument and (ii) terminated upon an elapsing of a price improvement period time, preset at the processor, not by the market participant, establishing the duration of said secondary auction, of less than a minute and commensurate with market risk, during which market participants make new bids or offers; and
   (f) a transaction executor communicating with said price improvement period timer and said electronic order book for allocating and executing upon said termination matches of bids or offers for said particular instrument, data for which are entered on said electronic order book, against market offers or bids in said order, subject to a partial time priority for said qualified market participant, and updating said electronic order book accordingly.

2. The processor of claim 1 wherein said best bid or offer prevailing across multiple markets is the best bid or offer on a national market.

3. The processor of claim 2 wherein said preset price improvement and increments in subsequent bids or offers during said price improvement are finer increments than those reported for best bids and offers on said national market.

4. The processor of claim 2 wherein said preset price improvement period is three seconds.

5. The processor of claim 2 wherein said qualified market participant is a non-market-maker broker-dealer and said qualified market participant receives time priority for forty percent by size of any remaining allocation at said qualified market participant's best price.

6. The processor of claim 5 wherein a market maker bidding or offering at the national best bid or offer at the commencement of said price improvement period receives time priority for one-third by size of any remaining allocation at said qualified market participant's best price after said qualified market participant's allocation at that or better price.

7. A processor for conducting a secondary auction in automatic trading of equity option contracts comprising:
   (a) a receiver for information messages from market participants in a primary auction that order bids for purchase or offers for sale of an equity option contract, said receiver time-stamping received information messages;
   (b) an electronic order book;
   (c) an updater communicating with said receiver and said electronic order book for qualifying and parsing price, size and time-stamp bid or offer data from information messages received on said receiver and entering said parsed data on said electronic order book with priority tracked by equity option contract in price and time-stamp of a received and qualified message;
   (d) a transmitter communicating with said electronic order book for display to market participants during said secondary auction data on price and quantity bid, but anonymous as to the identity of the bidder, entered on said electronic order book;
   (e) a price improvement period timer defining the pendency of the secondary auction, communicating with said updater (i) initiated upon receipt by said receiver of an information message from a qualified market participant containing a bid or offer at or better than a threshold price improvement, said threshold preset at the processor, not by the market participant, for said secondary auction, over the national best bid or offer for a particular equity option contract and (ii) terminated upon an elapsing of a price improvement period time, preset at the processor, not by the market participant, establishing the duration of said secondary auction, of greater than zero and less than ten seconds, during which market participants make new bids or offers; and (f) a transaction executor communicating with said price improvement period timer and said electronic order book for allocating and executing upon said termination matches of bids and offers for said particular equity option contact, data for which are entered on said electronic order book, against market offers or bids in said order, subject to a partial time priority for said qualified market participant, and updating said electronic order book accordingly.

8. The processor of claim 7 wherein said qualified market participant is an order flow provider and said order flow provider receives time priority for forty percent by size of any remaining allocation at said order flow provider's best price.

9. The processor of claim 8 wherein a market maker bidding or offering at the national best bid or offer at the commencement of said price improvement period receives time priority for one-third by size of any remaining allocation at said order flow provider's best price after said order flow provider's allocation at that or better price.

10. A computer program product for conducting a fast price improvement secondary auction of financial instruments traded across national markets in a primary auction, said computer program product residing on a computer-readable medium comprising instructions for causing a computer to: receive an order from a primary auction participant and time-stamping said receipt, initiate a price improvement period timer defining the pendency of a secondary price-improvement auction if the received order is at a better price, by greater than a threshold, preset for all said auctions and not by individual market participants, than the prevailing price across national markets, conduct said secondary auction until said timer is terminated after a time duration, preset for all said secondary auctions and not by individual market participants, of greater than zero and less than ten seconds where bids or offers are matched with contra market orders or bids, displayed anonymously, as to identity of the bidders, to auction participants during the price-improvement auction period during which market participants make new bids or offers, according to an allocation at the best price first and within each price level by time of receipt, with a share of any allocation at the best price level received from a market participant commencing said price-improvement auction reserved to said market participant.

11. A process for conducting a secondary auction in electronic trading of financial instruments comprising the steps of:
(a) receiving at an electronic trading host an information message in a primary auction that bids for purchase of or offers for sale a financial instrument;
(b) entering on an electronic order book data parsed from said information message where said information message bids for purchase of or offers for sale a financial instrument at price at or better than a threshold price improvement, said threshold preset, not by the market participant, for said secondary auction, over the best national bid or offer, wherein price and quantity information, but not identity of the bidder, are visible to market participants who may make new bids or offers during said secondary auction;
(c) initiating a price improvement period timer, defining the pendency of the secondary auction, upon receipt of the first said bid or offer at or better than said preset price improvement;
(d) receiving and entering information messages according to steps (a) and (b) until the elapsing on said timer of a price improvement period time, preset, not by the market participant, establishing the duration of said secondary auction;
(e) allocating and executing, using said electronic trading host, upon the said elapsing on said timer of said preset price improvement period time, matches of bids or offers for a particular equity option contract, data for which are entered on said electronic order book, in order of best bids or offers and earliest time of receipt at each price level, against market offers or bids, subject to a partial time priority for a qualified market participant from whom was received said information message initiating said price improvement period timer.

12. The process of claim 11 wherein said best bid or offer prevailing across multiple markets is the best bid or offer on a national market.

13. The process of claim 12 wherein said preset price improvement and increments in subsequent bids or offers during steps (a) and (b) are finer increments than those reported for best bids and offers on said national market.

14. The process of claim 13 wherein said preset price improvement period is three seconds.

15. The process of claim 12 wherein said qualified market participant is a non-market-maker broker-dealer and said qualified market participant receives time priority for forty percent by size of any remaining allocation at said qualified market participant's best price.

16. The process of claim 15 wherein a market maker bidding or offering at the national best bid or offer at the commencement of said price improvement period receives time priority for one-third by size of any remaining allocation at said qualified market participant's best price after said qualified market participant's allocation at that or better price.

17. A process for conducting a secondary auction in automatic trading of equity option contracts comprising:
(a) receiving at an electronic trading host an information message in a primary auction that bids for purchase of or offers for sale an equity option contract;
(b) entering on an electronic order book data parsed from said information message where said information message bids for purchase of or offers for sale an equity option contract at price at or better than a threshold price improvement, said threshold preset, not by the market participant, for said secondary auction, over a bid or offer prevailing on a national market, wherein price and quantity information, but not identity of the bidder, are visible to market participants who make new bids or offers during said secondary auction;
(c) initiating a price improvement period timer, defining the pendency of the secondary auction, upon receipt of the first said bid or offer at or better than said preset price improvement;
(d) receiving and entering information messages according to steps (a) and (b) until the elapsing on said timer of a price improvement period time, preset, not by the market participant, establishing the duration of said secondary auction, of greater than zero and less than ten seconds;
(e) allocating and executing, using said electronic trading host, upon the said elapsing on said timer of said preset price improvement period time, matches of bids or offers for a particular equity option contract data for which are entered on said electronic order book, in order of best bids or offers and earliest time of receipt at each price level, against market offers or bids, subject to a partial time priority for a qualified market participant from whom was received said information message initiating said price improvement period timer.

18. The process of claim 17 wherein said qualified market participant is an order flow provider and said order flow provider receives time priority for forty percent by size of any remaining allocation at said order flow provider's best price.

19. The process of claim 18 wherein a market maker bidding or offering at the national best bid or offer at the commencement of said price improvement period receives time priority for one-third by size of any remaining allocation at said order flow provider's best price after said order flow provider's allocation at that or better price.

20. A method for conducting a fast price improvement secondary auction of financial instruments traded across national markets in a primary auction, said method comprising the steps of: receiving and time-stamping, at an electronic trading host on a computer network an order from a market participant in the primary auction, initiating a price improvement period timer defining the pendency of a price-improvement secondary auction if the received offer is at a better price, by greater than a threshold, preset for all said auctions and not by individual market participants, than the prevailing price across national markets as received by said trading host over said network;

conducting in said trading host said secondary auction until said timer is terminated after a time duration, preset for all said secondary auctions and not by individual market participants, of greater than zero and less than ten seconds, in which improved bids or offers are received, displayed anonymously, as to identity of the bidders, to auction participants over said network during the price-improvement auction period during which market participants make new bids or offers; and at the termination of said secondary auction, matching contra market orders or bids, within said trading host according to an allocation at the best price first and within each price level by time of receipt, with a share of any allocation remaining at the best price level of said market participant commencing said price-improvement auction reserved to said market participant.

\* \* \* \* \*